US012731240B2

(12) United States Patent
Li et al.

(10) Patent No.: US 12,731,240 B2
(45) Date of Patent: Sep. 8, 2026

(54) METHOD, APPARATUS, AND DEVICE FOR TESTING ADHESIVE TAPE PASTED ONTO SURFACE OF ELECTRODE PLATE, AND MACHINE FOR PASTING ADHESIVE TAPE ONTO ELECTRODE PLATE

(71) Applicant: CONTEMPORARY AMPEREX TECHNOLOGY CO., LIMITED, Ningde (CN)

(72) Inventors: Chenfeng Li, Ningde (CN); Jinghua Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 270 days.

(21) Appl. No.: 18/410,358

(22) Filed: Jan. 11, 2024

(65) Prior Publication Data

US 2024/0153067 A1 May 9, 2024

Related U.S. Application Data

(63) Continuation of application No. PCT/CN2022/072117, filed on Jan. 14, 2022.

(51) Int. Cl.
*G06T 7/00* (2017.01)
*H01M 10/42* (2006.01)

(52) U.S. Cl.
CPC ....... *G06T 7/0008* (2013.01); *H01M 10/4285* (2013.01); *G06T 2207/10024* (2013.01)

(58) Field of Classification Search
CPC ....... G06T 7/0008; G06T 2207/10024; H01M 10/4285
USPC ........................................................ 382/141
See application file for complete search history.

(56) References Cited

FOREIGN PATENT DOCUMENTS

| | | | | |
|---|---|---|---|---|
| CN | 101832753 | A | * | 9/2010 |
| CN | 201796983 | U | | 4/2011 |
| CN | 202837202 | U | * | 3/2013 |
| CN | 206038548 | U | | 3/2017 |
| CN | 109685789 | A | | 4/2019 |
| CN | 110163850 | A | | 8/2019 |
| CN | 110501334 | A | | 11/2019 |

(Continued)

OTHER PUBLICATIONS

Japan Office Action for Application No. 2024-502233, mailed on Feb. 21, 2025, 5 pages.

(Continued)

*Primary Examiner* — Mark Roz
(74) *Attorney, Agent, or Firm* — Ladas & Parry LLP

(57) ABSTRACT

A method, an apparatus and a device for testing an adhesive tape pasted onto a surface of an electrode plate, and a machine for applying an adhesive tape to an electrode plate are described. In the method, a first surface image and a second surface image are acquired, where a color distance between a background color away from a tab side in the first surface image and a color of a first adhesive tape is set to be greater than or equal to a first preset value and a color distance between a background color away from the tab side in the second surface image and a color of a second adhesive tape is set to be greater than or equal to a second preset value, such that the colors of the first adhesive tape and the second adhesive tape are significantly different from the corresponding background colors.

15 Claims, 7 Drawing Sheets

(56) References Cited

FOREIGN PATENT DOCUMENTS

| | | | |
|---|---|---|---|
| CN | 111261919 | A | 6/2020 |
| CN | 111403679 | A | 7/2020 |
| CN | 112249795 | A | 1/2021 |
| JP | 2001307778 | A | 11/2001 |
| JP | 2002110148 | A | 4/2002 |
| JP | 2012148829 | A | 8/2012 |
| KR | 20160026068 | A | 3/2016 |

OTHER PUBLICATIONS

ISR for International Application No. PCT/CN2022/072117 mailed Aug. 8, 2022.
Written Opinion for International Application No. PCT /CN2022/072117 mailed Aug. 8, 2022.
Decision to Grant a Patent dated Aug. 22, 2025 for application JP 2024-502233.
Chinese Office Action dated May 10, 2026 for Chinese Appl. No. 202280019640.X.

* cited by examiner

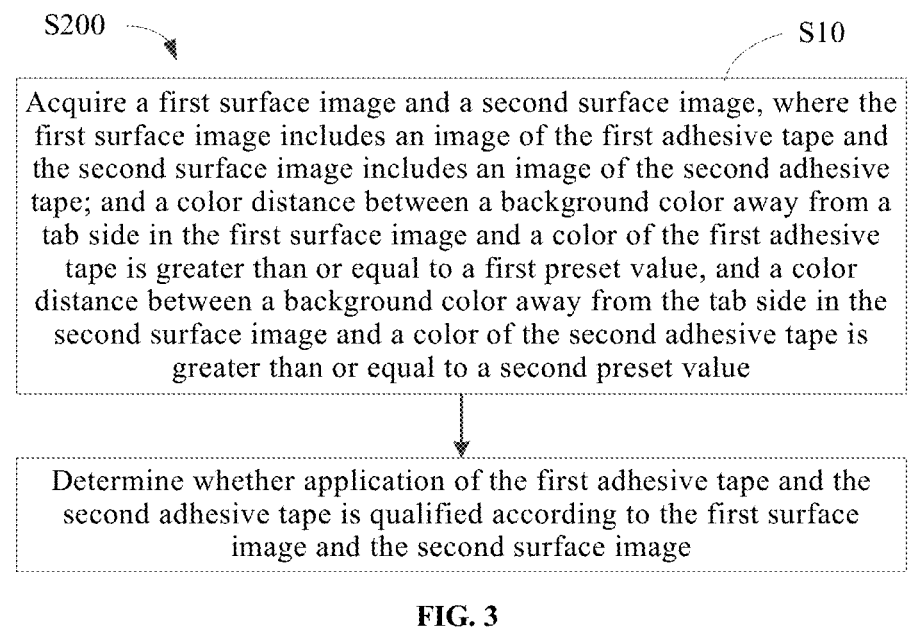

S200

S10

Acquire a first surface image and a second surface image, where the first surface image includes an image of the first adhesive tape and the second surface image includes an image of the second adhesive tape; and a color distance between a background color away from a tab side in the first surface image and a color of the first adhesive tape is greater than or equal to a first preset value, and a color distance between a background color away from the tab side in the second surface image and a color of the second adhesive tape is greater than or equal to a second preset value Determine whether application of the first adhesive tape and the second adhesive tape is qualified according to the first surface image and the second surface image

FIG. 3

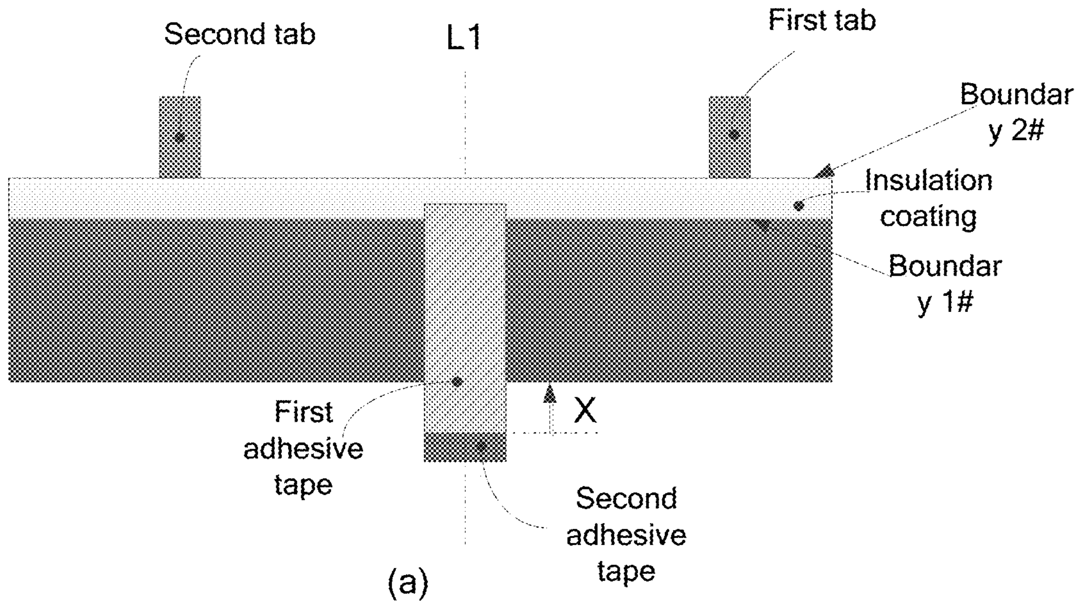
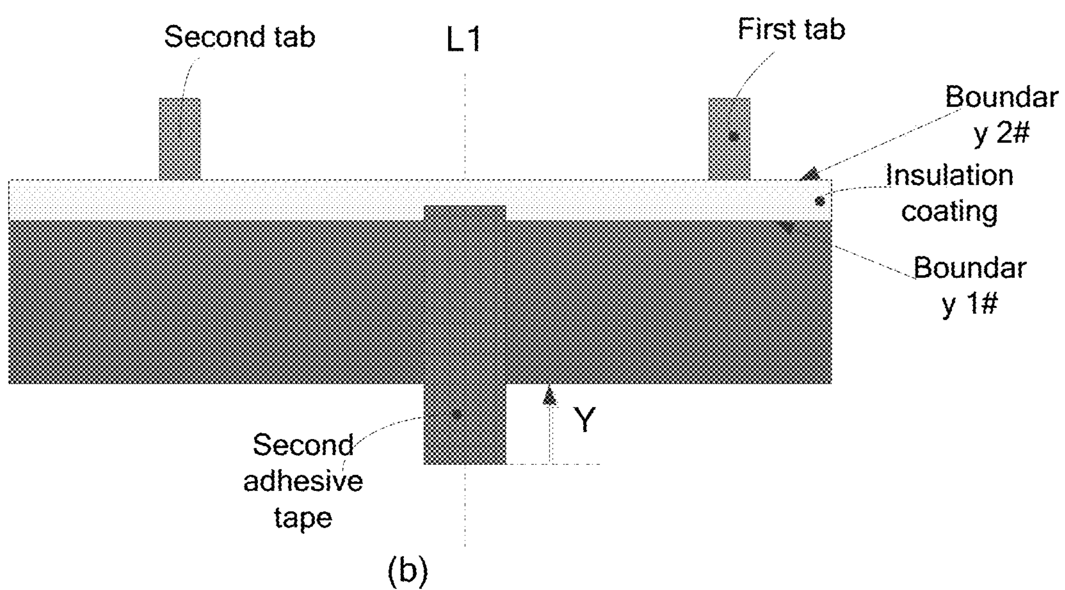
FIG. 7

According to a first surface image, determine whether a second end of a first adhesive tape close to a tab is located between a boundary of an insulation coating close to the tab and a boundary of an insulation coating away from the tab

According to a second surface image, determine whether a second end of the second adhesive tape close to the tab is located between the boundary of the insulation coating close to the tab and the boundary of the insulation coating away from the tab

If the second end of the first adhesive tape close to the tab is located between the boundary of the insulation coating close to the tab and the boundary of the insulation coating away from the tab and the second end of the second adhesive tape close to the tab is located between the boundary of the insulation coating close to the tab and the boundary of the insulation coating away from the tab, determine that application of the first adhesive tape and the second adhesive tape is qualified

FIG. 8

Apparatus 300 for testing application of an adhesive tape to a surface of an electrode plate Image acquisition module 301

Application qualification determination module 302

FIG. 9

METHOD, APPARATUS, AND DEVICE FOR TESTING ADHESIVE TAPE PASTED ONTO SURFACE OF ELECTRODE PLATE, AND MACHINE FOR PASTING ADHESIVE TAPE ONTO ELECTRODE PLATE

CROSS-REFERENCE TO RELATED APPLICATIONS

This application is a continuation of International application PCT/CN2022/072117 filed on Jan. 14, 2022, the subject matter of which is incorporated herein by reference in its entirety.

TECHNICAL FIELD

The present application relates to the technical field of batteries, and particularly relates to a method, an apparatus, and a device for testing an adhesive tape pasted onto a surface of an electrode plate, and a machine for pasting adhesive tape onto an electrode plate.

BACKGROUND

Currently, electric vehicles are mainly powered by batteries, and batteries have characteristics such as high capacity, high output voltage, and excellent charge-discharge cycling performance. During a production process of a battery, it is generally necessary to wind an anode electrode plate, a cathode electrode plate, and a separator into a core.

However, with the repeated charge and discharge of a battery, a serious lithium precipitation phenomenon is prone to occur at a corner of an inner ring of a core, and this phenomenon may even lead to explosion in severe cases, which has a great impact on safety of the battery.

SUMMARY

In view of the above problem, the present application provides a method, apparatus, and device for testing an adhesive tape pasted onto a surface of an electrode plate, and a machine for applying an adhesive tape to an electrode plate. In the present application, whether an adhesive tape pasted onto a surface of an electrode plate is qualified can be accurately determined to increase the safety of a battery.

In a first aspect, the present application provides a method for testing an adhesive tape pasted onto a surface of an electrode plate, where the electrode plate has a first surface and a second surface, and a first adhesive tape and a second adhesive tape are pasted onto the first surface and the second surface, respectively; and the method includes: acquiring a first surface image and a second surface image, where the first surface image includes an image of the first adhesive tape and the second surface image includes an image of the second adhesive tape; and a color distance between a background color away from a tab side in the first surface image and a color of the first adhesive tape is greater than or equal to a first preset value, and a color distance between a background color away from the tab side in the second surface image and a color of the second adhesive tape is greater than or equal to a second preset value; and determining whether application of the first adhesive tape and the second adhesive tape is qualified according to the first surface image and the second surface image.

In this technical solution of the embodiment of the present application, by setting the color distance between the background color away from the tab side in the first surface image and the color of the first adhesive tape to be greater than or equal to the first preset value and setting the color distance between the background color away from the tab side in the second surface image and the color of the second adhesive tape to be greater than or equal to the second preset value, the colors of the first adhesive tape and the second adhesive tape each are significantly different from a corresponding background color, such that a shape of the first adhesive tape and a position of the first adhesive tape relative to the electrode plate can be identified according to the first surface image, and a shape of the second adhesive tape and a position of the second adhesive tape relative to the electrode plate can be identified according to the second surface image, such as to accurately determine whether the pasting of the first adhesive tape and the second adhesive tape is qualified, which can increase the safety of a battery.

In a possible implementation of the first aspect, a color distance between the color of the first adhesive tape and the color of the second adhesive tape is greater than or equal to a third preset value.

In this technical solution of the embodiment of the present application, by setting the color distance between the color of the first adhesive tape and the color of the second adhesive tape to be greater than or equal to the third preset value to limit a discrimination index between the color of the first adhesive tape and the color of the second adhesive tape, an outcrop boundary of the first adhesive tape can be clearly determined from the first surface image, and an outcrop boundary of the second adhesive tape can be clearly determined from the second surface image, which is conducive to improvement of accuracy of testing of application.

In a possible implementation of the first aspect, the first preset value is greater than the third preset value, and the second preset value is greater than the third preset value.

In this technical solution of the embodiment of the present application, by setting a size relationship among the three gray thresholds of the first preset value, the second preset value, and the third preset value, it is easy to identify the first adhesive tape from a background of the first surface image, and it is easy to identify the second adhesive tape from a background of the second surface image, which is conducive to improvement of accuracy of testing of application of the adhesive tapes.

In a possible implementation of the first aspect, the background color away from the tab side in the first surface image is white, and/or, the background color away from the tab side in the second surface image is white.

In this technical solution of the embodiment of the present application, by setting the background color away from the tab side in the first surface image to be white and setting the background color away from the tab side in the second surface image to be white, the first adhesive tape and the second adhesive tape can be clearly distinguished from a background, such that the first adhesive tape and the second adhesive tape can be clearly identified, which is conducive to improvement of accuracy of testing of application of the adhesive tapes.

In a possible implementation of the first aspect, the determining whether application of the first adhesive tape and the second adhesive tape is qualified according to the first surface image and the second surface image includes: according to the first surface image, acquiring a first distance vector from a first end of the first adhesive tape away from a tab to a coating boundary of the electrode plate away from the tab; according to the second surface image, acquiring a second distance vector from a first end of the second adhesive tape away from the tab to the coating boundary of the electrode plate away from the tab; and determining whether the pasting of the first adhesive tape and the second adhesive tape is qualified according to the first distance vector and the second distance vector.

In this technical solution of the embodiment of the present application, the first surface image and the second surface image each are subjected to an identification test to obtain the first distance vector and the second distance vector, and then based on sizes and directions of the first distance vector and the second distance vector, it can accurately determine whether the pasting of the first adhesive tape and the second adhesive tape is qualified.

In a possible implementation of the first aspect, the determining whether the pasting of the first adhesive tape and the second adhesive tape is qualified according to the first distance vector and the second distance vector includes: with a direction towards the tab as a positive direction, if the first distance vector is greater than 0 and the second distance vector is greater than 0, determining that the pasting of the first adhesive tape and the second adhesive tape is qualified.

In this technical solution of the embodiment of the present application, whether the pasting of the first adhesive tape and the second adhesive tape is qualified can be accurately determined according to directions of the first distance vector and the second distance vector.

In a possible implementation of the first aspect, the determining whether the pasting of the first adhesive tape and the second adhesive tape is qualified according to the first distance vector and the second distance vector includes:

if an absolute value of a difference between the first distance vector and the second distance vector is within a preset range, determining that the pasting of the first adhesive tape and the second adhesive tape is qualified.

In this technical solution of the embodiment of the present application, whether the pasting of the first adhesive tape and the second adhesive tape is qualified can be accurately determined by comparing the absolute value of the difference between the first distance vector and the second distance vector with the preset range.

In a possible implementation of the first aspect, an insulation coating is provided between a tab and a coating boundary of the electrode plate adjacent to the tab; a color distance between a color of the insulation coating and the color of the first adhesive tape is greater than or equal to a fourth preset value, a color distance between the color of the insulation coating and the color of the second adhesive tape is greater than or equal to a fifth preset value, a color distance between a background color adjacent to the tab side in the first surface image and the color of the insulation coating is greater than or equal to a sixth preset value, and a color distance between a background color adjacent to the tab side in the second surface image and the color of the insulation coating is greater than or equal to the sixth preset value; and the determining whether application of the first adhesive tape and the second adhesive tape is qualified according to the first surface image and the second surface image further includes: according to the first surface image, determining whether a second end of the first adhesive tape adjacent to the tab is located between a boundary of the insulation coating adjacent to the tab and a boundary of the insulation coating away from the tab; according to the second surface image, determining whether a second end of the second adhesive tape adjacent to the tab is located between the boundary of the insulation coating adjacent to the tab and the boundary of the insulation coating away from the tab; and if the second end of the first adhesive tape adjacent to the tab is located between the boundary of the insulation coating adjacent to the tab and the boundary of the insulation coating away from the tab and the second end of the second adhesive tape adjacent to the tab is located between the boundary of the insulation coating adjacent to the tab and the boundary of the insulation coating away from the tab, determining that the pasting of the first adhesive tape and the second adhesive tape is qualified.

In this technical solution of the embodiment of the present application, in a first aspect, the color distance between the color of the insulation coating and the color of the first adhesive tape is greater than or equal to the fourth preset value, such that the color of the first adhesive tape is significantly different from the color of the insulation coating and it is easy to identify and distinguish the first adhesive tape and the insulation coating during an image test; and the color distance between the color of the insulation coating and the color of the second adhesive tape is greater than or equal to the fifth preset value, such that the color of the second adhesive tape is significantly different from the color of the insulation coating and it is easy to identify and distinguish the second adhesive tape and the insulation coating during an image test; and in a second aspect, the color distance between the background color adjacent to the tab side in the first surface image and the color of the insulation coating is set to be greater than or equal to the sixth preset value, and the color distance between the background color adjacent to the tab side in the second surface image and the color of the insulation coating is set to be greater than or equal to the sixth preset value, such that colors of insulation coatings on the first surface and the second surface are obvious in the first surface image and the second surface image, respectively, two boundaries of an insulation coating can be accurately captured when the first surface image is subjected to an identification test, and two boundaries of an insulation coating can be accurately captured when the second surface image is subjected to an identification test. Through the above two aspects, the accuracy of testing of application of the adhesive tapes can be effectively improved.

In a possible implementation of the first aspect, the sixth preset value is greater than the fourth preset value, and/or, the sixth preset value is greater than the fifth preset value.

In this technical solution of the embodiment of the present application, by setting a size relationship among the three gray thresholds of the fourth preset value, the fifth preset value, and the sixth preset value, it is easy to identify the insulation coating from the background of the first surface image, and it is easy to identify the insulation coating from the background of the second surface image, which is conducive to improvement of accuracy of testing of application of the adhesive tapes.

In a possible implementation of the first aspect, the background color adjacent to the tab side in the first surface image is black, and/or, the background color adjacent to the tab side in the second surface image is black.

In this technical solution of the embodiment of the present application, by setting the background color adjacent to the tab side in the first surface image to be black and setting the background color adjacent to the tab side in the second surface image to be black, the insulation coating on the electrode plate can be clearly distinguished from a background, such that the two boundaries of the insulation coating can be clearly captured, which is conducive to improvement of accuracy of testing of application of the adhesive tapes.

In a second aspect, the present application provides an apparatus for testing an adhesive tape pasted onto a surface of an electrode plate, including an image acquisition module and an pasting qualification determination module, where the image acquisition module is configured to acquire a first surface image and a second surface image, where the first surface image includes an image of a first adhesive tape and the second surface image includes an image of a second adhesive tape; and a color distance between a background color away from a tab side in the first surface image and a color of the first adhesive tape is greater than or equal to a first preset value, and a color distance between a background color away from the tab side in the second surface image and a color of the second adhesive tape is greater than or equal to a second preset value; and the pasting qualification determination module is configured to determine whether application of the first adhesive tape and the second adhesive tape is qualified according to the first surface image and the second surface image.

In this technical solution of the embodiment of the present application, by setting the color distance between the background color away from the tab side in the first surface image and the color of the first adhesive tape to be greater than or equal to the first preset value and setting the color distance between the background color away from the tab side in the second surface image and the color of the second adhesive tape to be greater than or equal to the second preset value, the colors of the first adhesive tape and the second adhesive tape each are significantly different from a corresponding background color, such that a shape of the first adhesive tape and a position of the first adhesive tape relative to the electrode plate can be identified according to the first surface image, and a shape of the second adhesive tape and a position of the second adhesive tape relative to the electrode plate can be identified according to the second surface image, such as to accurately determine whether the pasting of the first adhesive tape and the second adhesive tape is qualified, which can increase the safety of a battery.

In a third aspect, the present application provides a device for testing an adhesive tape pasted onto an electrode plate, where the electrode plate has a first surface and a second surface, and a first adhesive tape and a second adhesive tape are pasted onto the first surface and the second surface of the electrode plate at preset positions, respectively. The device for testing an adhesive tape pasted onto an electrode plate includes a first image acquisition unit, a second image acquisition unit, a processor, and a memory.

The first image acquisition unit is configured to acquire a first surface image, where the first surface image includes an image of the first adhesive tape, and a color distance between a background color away from a tab side in the first surface image and a color of the first adhesive tape is greater than or equal to a first preset value; the second image acquisition unit is configured to acquire a second surface image, where the second surface image includes an image of the second adhesive tape, and a color distance between a background color away from the tab side in the second surface image and a color of the second adhesive tape is greater than or equal to a second preset value; the processor is in communication connection with each of the first image acquisition unit and the second image acquisition unit to acquire the first surface image and the second surface image; and the memory is in communication connection with the processor, the memory stores an instruction capable of being executed by the processor, and when the instruction is executed by the processor, the processor executes the method described in the first aspect.

In this technical solution of the embodiment of the present application, the device for testing an adhesive tape pasted onto an electrode plate can accurately test whether the pasting of an adhesive tape to a surface of an electrode plate is qualified.

In a fourth aspect, the present application provides a machine for pasting an adhesive tape onto an electrode plate, including the device for testing an adhesive tape pasted onto an electrode plate described in the third aspect.

In this technical solution of the embodiment of the present application, the machine for pasting an adhesive tape onto an electrode plate has a function of accurately testing pasting of an adhesive tape, which helps to ensure the qualified pasting of an adhesive tape onto an electrode plate.

The above description is merely a summary of the technical solutions of the present application. In order to allow the technical means of the present application to be understood clearly and implemented in accordance with the content of the specification and allow the above and other objectives, features, and advantages of the present application to be obviously and easily understood, specific implementations of the present application are described below.

BRIEF DESCRIPTION OF THE DRAWINGS

By reading the detailed description of the following preferred implementations, various other advantages and benefits will become apparent to those of ordinary skill in the art. The accompanying drawings are provided merely to illustrate the preferred implementations, rather than to limit the present application. In the accompanying drawings, the same reference numerals represent the same components. In the accompanying drawings:

FIG. 3 is a schematic flow chart of a method for testing an adhesive tape pasted onto a surface of an electrode plate in some embodiments of the present application;

FIG. 7 is a schematic diagram of a first distance vector X and a second distance vector Y in some embodiments of the present application;

FIG. 8 is a schematic diagram of another sub-process of step S20 in the method shown in FIG. 3;

FIG. 9 is a schematic structural diagram of an apparatus 300 for testing an adhesive tape pasted onto a surface of an electrode plate in some embodiments of the present application.

DETAILED DESCRIPTION

Figure 1:
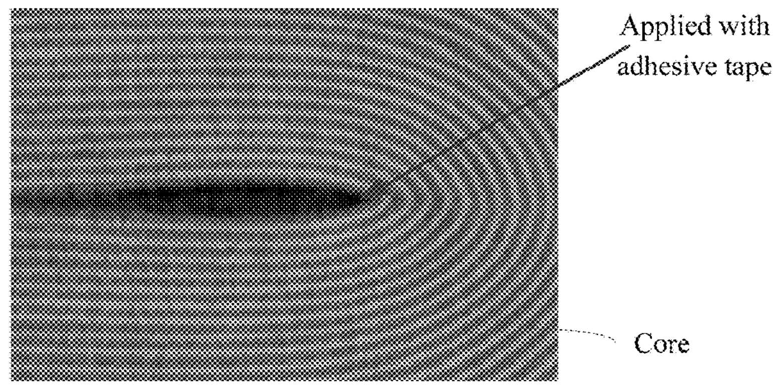
FIG. 1 is a schematic diagram of a core in some embodiments of the present application.

Embodiments of the technical solutions of the present disclosure will be described in detail below with reference to the accompanying drawings. The following embodiments are merely used to more clearly illustrate the technical solutions of the present disclosure. Therefore, these embodiments are merely exemplary and are not intended to limit the protection scope of the present disclosure.

Unless otherwise defined, all technical and scientific terms used in this specification have the same meanings as those commonly understood by those skilled in the art of the present disclosure. The terms used in this specification are merely intended to describe specific embodiments, and are not intended to limit the present disclosure. The terms "includes" and "has" in the specification and claims of the present disclosure and the foregoing description of the accompanying drawings and any modification thereof are intended to cover non-exclusive inclusion.

In the description of the embodiments of the present disclosure, technical terms "first", "second", and the like are used merely to distinguish different objects, and cannot be understood as indicating or implying relative importance or implying a quantity, a specific sequence, or a primary and secondary relationship of the indicated technical features. In the description of the embodiments of the present disclosure, "a plurality of" means two or more, unless otherwise specifically defined.

The term "embodiment" mentioned herein means that a specific feature, structure, or characteristic described in combination with the embodiment may be included in at least one embodiment of the present application. The term appearing in different parts of the specification does not necessarily refer to the same embodiment or an independent or alternative embodiment exclusive of other embodiments. It may be explicitly or implicitly appreciated by those skilled in the art that the embodiments described herein may be combined with other embodiments.

In the description of the embodiments of the present disclosure, the term "and/or" merely describes associations between associated objects, and it indicates three types of relationships. For example, A and/or B may indicate that A exists alone, A and B exist at the same time, or B exists alone. In addition, the character "/" in this specification generally indicates that the associated objects are in an "or" relationship.

In the description of the embodiments of the present application, the term "a plurality of" refers to two or more, and similarly, "a plurality of groups" refers to two or more groups and "a plurality of electrodes" refers to two or more electrodes.

In the description of the embodiments of the present disclosure, the technical terms such as "central", "longitudinal", "transverse", "length", "width", "thickness", "upper", "lower", "front", "back", "left", "right", "vertical", "horizontal", "top", "bottom", "inner", "outer", "clockwise", "anticlockwise", "axial direction", "radial direction" and "circumferential direction" are orientations or positional relationships shown based on the accompanying drawings. These terms are merely intended to facilitate describing the embodiments of the present disclosure and make the description simple, rather than to indicate or imply that a mentioned apparatus or element must have a specific orientation or be constructed and operated in the specific orientation. Therefore, these terms cannot be construed as a limitation to the present disclosure.

In the description of the embodiments of the present disclosure, unless otherwise clearly specified and defined, the technical terms such as "mounting", "interconnection", "connection" and "fixation" should be understood in a broad sense. For example, the "connection" may be a fixed connection, removable connection or integral connection; may be a mechanical connection or electrical connection; may be a direct connection or indirect connection through a medium; and may be a communication or interaction between two elements. Those of ordinary skill in the art may understand specific meanings of the foregoing terms in the embodiments of the present disclosure based on a specific situation.

With the development of green energy, the application of batteries is increasingly extensive. In particular, in the new energy vehicle field, information appliance field, or photovoltaic power generation field emerging in recent years, batteries are used as important energy storage or power supply devices. For example, a battery is used to supply a power for a new energy vehicle or a terminal device, or a battery is used to store energy for a solar panel. With the continuous expansion of application fields of batteries, a demand for batteries on the market is also increasing.

However, with the repeated charge and discharge of a battery, a corner of an innermost ring of a core is prone to a serious lithium precipitation phenomenon, and this phenomenon may even lead to explosion in severe cases, which has a great impact on safety of the battery.

Figure 2:
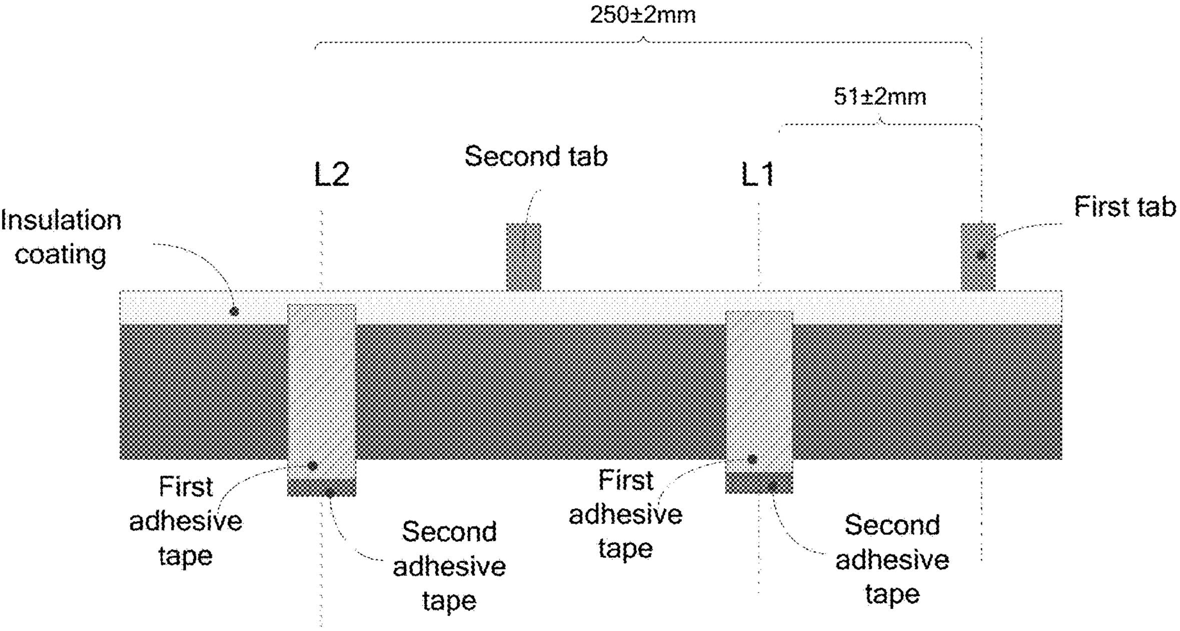
FIG. 2 is a schematic diagram of application of an adhesive tape to an electrode plate in some embodiments of the present application.

Currently, as shown in FIG. 1, an adhesive tape application procedure is generally introduced between a die-cutting and slitting procedure and a winding procedure for an electrode plate to apply an adhesive tape to two corners of an electrode plate in an innermost ring of a core at corresponding positions, which can effectively prevent the precipitation of lithium. Specifically, as shown in FIG. 2, after the die-cutting and slitting for the electrode plate is completed, with a first tab of the electrode plate as a reference (when the electrode plate is wound, the first tab is first rolled into the core), a first center line position L1 for an adhesive tape is positioned at a preset distance (such as 51±2 mm) from the first tab, and a machine for applying an adhesive tape is used to apply a first adhesive tape and a second adhesive tape on A/B sides at L1 of the electrode plate, respectively; and a second center line position L2 for an adhesive tape is positioned at another preset distance (such as 250±2 mm) from the first tab, and a machine for applying an adhesive tape is used to apply a first adhesive tape and a second adhesive tape on A/B sides at L2 of the electrode plate, respectively. It should be understood that the A/B sides here refer to two surfaces of the electrode plate, respectively.

At a corner of an innermost ring of a core, such as L1, a state after adhesive tape application is as follows: ends of the first adhesive tape and the second adhesive tape that are adjacent to a tab side are between two boundaries of an insulation coating; and ends of the first adhesive tape and the second adhesive tape that are away from a tab side each exceed a boundary of an electrode plate by a specified length such as 2 mm to 3 mm, and it should be understood that the specific excess length can be set according to an actual situation. Thus, it can be ensured that the ends of the first adhesive tape and the second adhesive tape that are away from a tab side can be bonded together (that is, the ends overlap each other), such that the first adhesive tape and the second adhesive tape are not easy to fall off during the subsequent winding and rolling of the electrode plate, which can effectively prevent the precipitation of lithium at a corner of an inner ring of the electrode plate (namely, L1 and L2).

After the pasting of an adhesive tape is completed, it is necessary to test the adhesive tape to determine whether the pasting of the adhesive tape to a surface of an electrode plate is qualified. Generally, the electrode plate is photographed by a camera, then a captured image is processed to complete the testing of application of the adhesive tape, and an unqualified adhesive tape tested is marked. However, a test result is inaccurate because it is not easy to identify and distinguish an adhesive tape during a test, that is, it is impossible to conduct the fool-proof monitoring of falling-off of the adhesive tape.

Based on the above considerations, the inventors of the present application have found through research that a color of an adhesive tape and a background color can be set to allow a large difference between the color of the adhesive paper and the background color, such that it is easy to identify and distinguish the adhesive paper during an identification test of an image, and thus it can accurately determine whether the adhesive paper pasted onto a surface of an electrode plate is qualified to increase the safety of a battery.

Specifically, an electrode plate has a first surface and a second surface, and a first adhesive tape and a second adhesive tape are pasted onto the first surface and the second surface, respectively. A first surface image and a second surface image are first acquired, where the first surface image includes an image of the first adhesive tape and the second surface image includes an image of the second adhesive tape; and a color distance between a background color away from a tab side in the first surface image and a color of the first adhesive tape is greater than or equal to a first preset value, and a color distance between a background color away from the tab side in the second surface image and a color of the second adhesive tape is greater than or equal to a second preset value.

Whether application of the first adhesive tape and the second adhesive tape is qualified is then determined according to the first surface image and the second surface image.

Since the color distance between the background color away from the tab side in the first surface image and the color of the first adhesive tape is greater than or equal to the first preset value, the color of the first adhesive tape is significantly different from the background color below, and thus it is easy to identify and distinguish the first adhesive tape during an image test.

Since the color distance between the background color away from the tab side in the second surface image and the color of the second adhesive tape is greater than or equal to the second preset value, the color of the second adhesive tape is significantly different from the background color below, and thus it is easy to identify and distinguish the second adhesive tape during an image test.

In the above solution, by setting the color distance between the background color away from the tab side in the first surface image and the color of the first adhesive tape to be greater than or equal to the first preset value and setting the color distance between the background color away from the tab side in the second surface image and the color of the second adhesive tape to be greater than or equal to the second preset value, the colors of the first adhesive tape and the second adhesive tape each are significantly different from a corresponding background color, such that a shape of the first adhesive tape and a position of the first adhesive tape relative to the electrode plate can be identified according to the first surface image, and a shape of the second adhesive tape and a position of the second adhesive tape relative to the electrode plate can be identified according to the second surface image, such as to accurately determine whether the pasting of the first adhesive tape and the second adhesive tape is qualified, which can increase the safety of a battery.

The method provided by the embodiment of the present application refers to a method for testing an adhesive tape pasted onto a surface of an electrode plate, and the method may be used in a device for testing an adhesive tape pasted onto an electrode plate.

It should be understood that, when the pasting of an adhesive tape is tested after an adhesive tape application procedure introduced between a die-cutting and slitting procedure and a winding procedure is conducted, the device for testing an adhesive tape pasted onto an electrode plate is arranged on a machine for applying an adhesive tape to an electrode plate, such that the device for testing an adhesive tape pasted onto an electrode plate can be used in the machine for applying an adhesive tape to an electrode plate to provide a function of testing application of an adhesive tape for the machine. Thus, the machine for applying an adhesive tape to an electrode plate includes the device for testing an adhesive tape pasted onto an electrode plate.

According to some embodiments of the present application, FIG. 3 is a schematic flow chart of a method for testing an adhesive tape pasted onto a surface of an electrode plate in the embodiments of the present application, and as shown in FIG. 3, the method S200 may specifically include the following step:

S10: A first surface image and a second surface image are acquired.

It should be understood that the electrode plate has a first surface and a second surface. The electrode plate here can be a cathode electrode plate or an anode electrode plate. For example, when an adhesive tape needs to be applied to a cathode electrode plate and the pasting of the adhesive tape needs to be tested, the electrode plate here refers to the cathode electrode plate; and when an adhesive tape needs to be applied to an anode electrode plate and the pasting of the adhesive tape needs to be tested, the electrode plate here refers to the anode electrode plate. Therefore, the electrode plate can be a cathode electrode plate or an anode electrode plate according to an actual situation, which is not limited here in any way.

The electrode plate has a laminated structure, and the first surface and the second surface refer to front and back sides of the electrode plate, also known as AB sides. If a surface towards a central axis in a core is a front side (or A side) and a surface away from the central axis is a back side (or B side), when the first surface is a front side (or A side), the second surface is a back side (or B side); and when the first surface is a back side (or B side), the second surface is a front side (or A side).

A first adhesive tape and a second adhesive tape are pasted onto the first surface and the second surface, respectively. As shown in FIG. 2, the first adhesive tape is applied at L1 and L2 on the first surface of the electrode plate, and the second adhesive tape is applied at L1 and L2 on the second surface of the electrode plate. For L1 or L2, center lines of the first adhesive tape and the second adhesive tape both coincide roughly with L1 or L2, such that projections of the first adhesive tape and the second adhesive tape that are perpendicular to the electrode plate coincide roughly with each other. Moreover, both the first adhesive tape and the second adhesive tape extend beyond a boundary of the electrode plate away from a tab side, that is, both the first adhesive tape and the second adhesive tape have outcrops; and the outcrops are bonded together under an electrostatic interaction.

Figure 4:
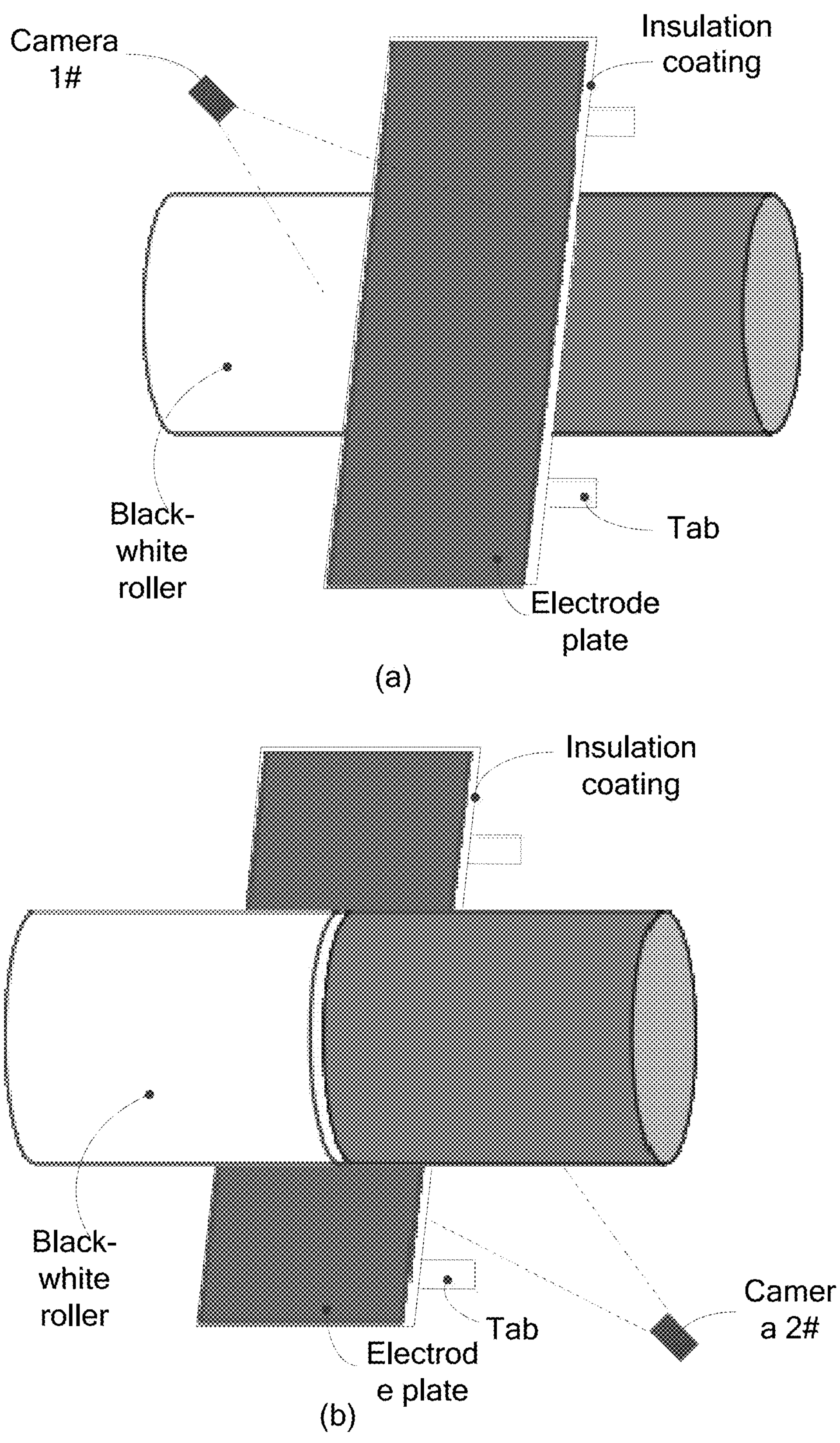
FIG. 4(*a*) is a schematic picture of a first surface image in some embodiments of the present application and FIG. 4(*b*) is a schematic picture of a second surface image in some embodiments of the present application.

The first surface image includes an image of the first adhesive tape and the second surface image includes an image of the second adhesive tape. As shown in FIG. 4, for example, during a transfer process of the electrode plate, the first surface can be photographed by a camera 1 # to obtain the first surface image including the first adhesive tape, and the second surface can be photographed by a camera 2 # to obtain the second surface image including the second adhesive tape.

Figure 5:
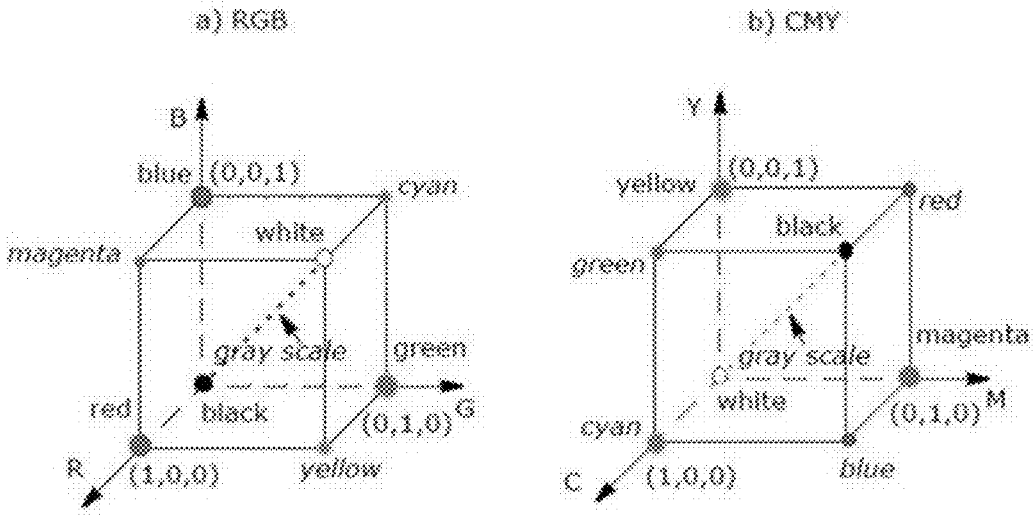
FIG. 5 is a schematic diagram of a color space in some embodiments of the present application.

A color distance between a background color away from a tab side in the first surface image and a color of the first adhesive tape is greater than or equal to a first preset value. It should be understood that, when the first surface image is acquired, a background can be arranged below the electrode plate, for example, the background can be a transfer table, a roller, or an arranged background plate. A background color away from a tab side (namely, a background color below an outcrop of the first adhesive tape) and a color of the first adhesive tape are set to be significantly different. Specifically, as shown in FIG. 5, in a color space, a color distance between a background color away from a tab side in the first surface image and a color of the first adhesive tape is greater than or equal to a first preset value, such that the color of the first adhesive tape is significantly different from the background color below, and thus it is easy to identify and distinguish the first adhesive tape during an image test.

A color distance between a background color away from the tab side in the second surface image and a color of the second adhesive tape is greater than or equal to a second preset value. It should be understood that, when the second surface image is acquired, a background can be arranged below the electrode plate, for example, the background can be a transfer table, a roller, or an arranged background plate. A background color away from a tab side (namely, a background color below an outcrop of the second adhesive tape) and a color of the second adhesive tape are set to be significantly different. Specifically, as shown in FIG. 5, in a color space, a color distance between a background color away from a tab side in the second surface image and a color of the second adhesive tape is greater than or equal to a second preset value, such that the color of the second adhesive tape is significantly different from the background color below, and thus it is easy to identify and distinguish the second adhesive tape during an image test.

It should be understood that the first preset value and the second preset value are empirical values, and can be specifically set by those skilled in the art according to image test needs, which is not limited here in any way. The color space can be an RGB color space or a CMY color space, which is not limited here in any way. A color distance refers to a distance between two colors in a color space.

In some embodiments, when the first surface image and the second surface image are three-channel color images, a color distance may be calculated according to gray values of three channels. Specifically, a color distance between a color $C_1$ and a color $C_2$ is calculated according to the following formula:

$$\|C_1-C_2\|=\sqrt{(C_{1,R}-C_{2,R})^2+(C_{1,G}-C_{2,G})^2+(C_{1,B}-C_{1,B})^2}$$

where $\|C_1-C_2\|$ represents a color distance between the color $C_1$ and the color $C_2$, $C_{1,R}$ represents a gray value of an R channel of the color $C_1$, $C_{1,G}$ represents a gray value of a G channel of the color $C_1$, $C_{1,B}$ represents a gray value of a B channel of the color $C_1$, $C_{2,R}$ represents a gray value of an R channel of the color $C_2$, $C_{2,G}$ represents a gray value of a G channel of the color $C_2$, and $C_{2,B}$ represents a gray value of a B channel of the color $C_2$.

In some embodiments, a gray value of a single channel may also be used to calculate a color distance, for example, a gray value of an R channel is used to calculate a color distance between the color $C_1$ and the color $C_2$, and a specific formula is as follows:

$$\|C_1-C_2\|=\sqrt{(C_{1,R}-C_{2,R})^2}$$

where $\|C_1-C_2\|$ represents a color distance between the color $C_1$ and the color $C_2$, $C_{1,R}$ represents a gray value of an R channel of the color $C_1$, and $C_{2,R}$ represents a gray value of an R channel of the color $C_2$.

It should be understood that the larger the color distance, the greater the difference between the two colors and the easier it is to distinguish between the two colors; and the smaller the color distance, the smaller the difference between the two colors and the less likely it is to distinguish between the two colors.

S20: Whether application of the first adhesive tape and the second adhesive tape is qualified is then determined according to the first surface image and the second surface image.

After the first surface image in which the first adhesive tape is easily distinguished and the second surface image in which the second adhesive tape is easily distinguished, the existing image recognition algorithm or pixel comparison algorithm can be used for the first surface image and the second surface image to acquire a shape and position of the first adhesive tape and a shape and position of the second adhesive tape, and then the shape and position of the first adhesive tape is compared with the shape and position of the second adhesive tape to determine whether the pasting of the first adhesive tape and the second adhesive tape is qualified.

In this embodiment, by setting the color distance between the background color away from the tab side in the first surface image and the color of the first adhesive tape to be greater than or equal to the first preset value and setting the color distance between the background color away from the tab side in the second surface image and the color of the second adhesive tape to be greater than or equal to the second preset value, the colors of the first adhesive tape and the second adhesive tape each are significantly different from a corresponding background color, such that a shape of the first adhesive tape and a position of the first adhesive tape relative to the electrode plate can be identified according to the first surface image, and a shape of the second adhesive tape and a position of the second adhesive tape relative to the electrode plate can be identified according to the second surface image, such as to accurately determine whether the pasting of the first adhesive tape and the second adhesive tape is qualified, which can increase the safety of a battery.

According to some embodiments of the present application, optionally, a color distance between the color of the first adhesive tape and the color of the second adhesive tape is greater than or equal to a third preset value.

In the case of qualified application, an outcrop of the first adhesive tape has an overlap with an outcrop of the second adhesive tape, and in order to well distinguish between the first adhesive tape and the second adhesive tape, the color distance between the color of the first adhesive tape and the color of the second adhesive tape is set to be greater than or equal to the third preset value. It should be understood that the third preset value is a set gray threshold, which is provided to limit a discrimination index between the color of the first adhesive tape and the color of the second adhesive tape and may be specifically set by those skilled in the art according to an actual situation.

In some embodiments, the first adhesive tape may be brown (a gray value of an R channel of brown is 80 to 90) and the second adhesive tape may be blue (a gray value of an R channel of blue is 40 to 50); and the third preset value may be 20 or 30. Based on a high discrimination index between brown and blue, even if the first adhesive tape has an overlap with the second adhesive tape, an outcrop boundary of the first adhesive tape can be clearly determined from the first surface image, and an outcrop boundary of the second adhesive tape can be clearly determined from the second surface image.

It can be understood that, in some embodiments, since the first adhesive tape and the second adhesive tape are very thin and have specified light permeability, if an outcrop of the first adhesive tape and an outcrop of the second adhesive tape overlap with each other, a color of an overlapped part will be darkened, such that the outcrop boundary of the first adhesive tape and the outcrop boundary of the second adhesive tape are clear and can be easily distinguished. Thus, in this embodiment, even if the first adhesive tape and the second adhesive tape have a similar or same color, the outcrop boundary of the first adhesive tape can be clearly determined from the first surface image, and the outcrop boundary of the second adhesive tape can be clearly determined from the second surface image.

In the above embodiment, by setting the color distance between the color of the first adhesive tape and the color of the second adhesive tape to be greater than or equal to the third preset value to limit a discrimination index between the color of the first adhesive tape and the color of the second adhesive tape, the outcrop boundary of the first adhesive tape can be clearly determined from the first surface image, and the outcrop boundary of the second adhesive tape can be clearly determined from the second surface image, which is conducive to improvement of accuracy of testing of application.

According to some embodiments of the present application, optionally, the first preset value is greater than the third preset value, and the second preset value is greater than the third preset value.

It can be understood that the first preset value is provided to limit a discrimination index between the color of the first adhesive tape and the background color away from the tab side in the first surface image; the second preset value is provided to limit a discrimination index between the color of the second adhesive tape and the background color away from the tab side in the second surface image; and the third preset value is provided to limit a discrimination index between the color of the first adhesive tape and the color of the second adhesive tape.

The larger the gray threshold, the higher the discrimination index. Therefore, the first preset value is set to be greater than the third preset value, such that the discrimination index between the color of the first adhesive tape and the background color away from the tab side in the first surface image is higher than the discrimination index between the color of the first adhesive tape and the color of the second adhesive tape, and thus the first adhesive tape is easily identified from a background of the first surface image; and similarly, the second preset value is set to be greater than the third preset value, such that the discrimination index between the color of the second adhesive tape and the background color away from the tab side in the second surface image is higher than the discrimination index between the color of the first adhesive tape and the color of the second adhesive tape, and thus the second adhesive tape is easily identified from a background of the second surface image.

In this embodiment, by setting a size relationship among the three gray thresholds of the first preset value, the second preset value, and the third preset value, it is easy to identify the first adhesive tape from the background of the first surface image, and it is easy to identify the second adhesive tape from the background of the second surface image, which is conducive to improvement of accuracy of testing of application of the adhesive tapes.

According to some embodiments of the present application, optionally, the background color away from the tab side in the first surface image is white, and/or, the background color away from the tab side in the second surface image is white.

For example, as shown in FIG. 4, when the first surface image is acquired, based on an angle of view of the camera 1 #, a roller is arranged below the second surface of the electrode plate, and the roller can transfer the electrode plate and serve as a background for acquisition of the first surface image. A color of a region of the roller on which an edge of the electrode plate away from the tab side is projected is the background color away from the tab side in the first surface image, and a region of the roller on which an edge of the electrode plate away from the tab side is projected is set to be white.

It should be understood that, when the first surface image is acquired, based on an angle of view of the camera 1 #, a background plate is arranged below the second surface of the electrode plate; and a color of a region of the background plate on which an edge of the electrode plate away from the tab side is projected is the background color away from the tab side in the first surface image, and a region of the background plate on which an edge of the electrode plate away from the tab side is projected is set to be white.

A gray value based on white is about 255, and white is clearly distinguished from a color of the electrode plate (the electrode plate is generally black), such that an edge of the electrode plate can be clearly captured. In addition, white is also clearly distinguished from the color of the first adhesive tape, such that the outcrop boundary of the first adhesive tape can be clearly identified.

Similarly, in some embodiments, when the second surface image is acquired, based on an angle of view of the camera 2 #, a roller is arranged below the first surface of the electrode plate, and the roller can transfer the electrode plate and serve as a background for acquisition of the second surface image. A color of a region of the roller on which an edge of the electrode plate away from the tab side is projected is the background color away from the tab side in the second surface image, and a region of the roller on which an edge of the electrode plate away from the tab side is projected is set to be white.

It should be understood that, when the second surface image is acquired, based on an angle of view of the camera 2 #, a background plate is arranged below the first surface of the electrode plate; and a color of a region of the background plate on which an edge of the electrode plate away from the tab side is projected is the background color away from the tab side in the second surface image, and a region of the background plate on which an edge of the electrode plate away from the tab side is projected is set to be white.

A gray value based on white is about 255, and white is clearly distinguished from a color of the electrode plate (the electrode plate is generally black), such that an edge of the electrode plate can be clearly captured. In addition, white is also clearly distinguished from the color of the second adhesive tape, such that the outcrop boundary of the second adhesive tape can be clearly identified.

In this embodiment, by setting the background color away from the tab side in the first surface image to be white and setting the background color away from the tab side in the second surface image to be white, the first adhesive tape and the second adhesive tape can be clearly distinguished from a background, such that the first adhesive tape and the second adhesive tape can be clearly identified, which is conducive to improvement of accuracy of testing of application of the adhesive tapes.

Figure 6:
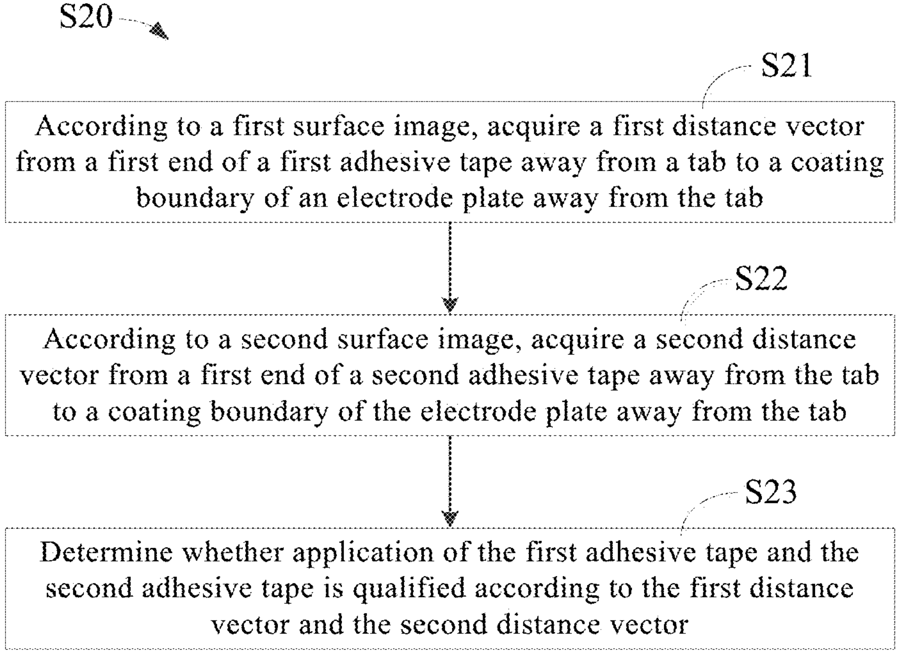
FIG. 6 is a schematic diagram of a sub-process of step S20 in the method shown in FIG. 3.

According to some embodiments of the present application, optionally, as shown in FIG. 6, S20 specifically includes:

S21: According to the first surface image, a first distance vector from a first end of first adhesive tape away from a tab to a coating boundary of the electrode plate away from the tab is acquired.

S22: According to the second surface image, a second distance vector from a first end of the second adhesive tape away from the tab to the coating boundary of the electrode plate away from the tab is acquired.

S23: Whether the pasting of the first adhesive tape and the second adhesive tape is qualified is determined according to the first distance vector and the second distance vector.

As shown in FIG. 7(*a*), in the first surface image, the existing edge detection algorithm can be used to capture an edge of the first adhesive tape, such that a first end of the first adhesive tape away from the tab can be captured, that is, an end boundary of the first adhesive tape away from the tab can be captured. It should be understood that the first surface and the second surface of the electrode plate each are coated with a coating, and the existing edge detection algorithm can be used to capture an edge of the coating of the electrode plate, that is, a coating boundary of the electrode plate away from the tab can be captured. A pixel distance from the end boundary of the first adhesive tape away from the tab to the coating boundary of the electrode plate away from the tab can be converted into the first distance vector X from the first end of the first adhesive tape away from the tab to the coating boundary of the electrode plate away from the tab.

As shown in FIG. 7(*b*), in the second surface image, the existing edge detection algorithm can be used to capture an edge of the second adhesive tape, such that a first end of the second adhesive tape away from the tab can be captured, that is, an end boundary of the second adhesive tape away from the tab can be captured. It should be understood that the first surface and the second surface of the electrode plate each are coated with a coating, and the existing edge detection algorithm can be used to capture an edge of the coating of the electrode plate, that is, a coating boundary of the electrode plate away from the tab can be captured. A pixel distance from the end boundary of the second adhesive tape away from the tab to the coating boundary of the electrode plate away from the tab can be converted into the second distance vector Y from the first end of the second adhesive tape away from the tab to the coating boundary of the electrode plate away from the tab.

It can be understood that, in FIG. 7(*a*) and FIG. 7 (*b*), in order to clearly mark the first distance vector X and the second distance vector Y, an actual scale is adjusted, that is, the scales in FIG. 7(*a*) and FIG. 7 (*b*) do not limit the present application in any way.

After the first distance vector X and the second distance vector Y are acquired, whether the pasting of the first adhesive tape and the second adhesive tape is qualified can be determined according to a size and direction of the first distance vector X and a size and direction of the second distance vector Y. For example, if the first distance vector X and the second distance vector Y both face towards the tab, it means that the first end of the first adhesive tape away from the tab and the first end of the second adhesive tape away from the tab both extend beyond the coating boundary of the electrode plate away from the tab. That is, both the first adhesive tape and the second adhesive tape have outcrops, and the outcrops of the two can also be bonded together under an electrostatic interaction, such that the adhesive tapes are not easy to fall off during the subsequent winding and rolling.

In this embodiment, the first surface image and the second surface image each are subjected to an identification test to obtain the first distance vector and the second distance vector, and then based on the sizes and directions of the first distance vector and the second distance vector, it can accurately determine whether the pasting of the first adhesive tape and the second adhesive tape is qualified.

According to some embodiments of the present application, optionally, S23 specifically includes:

with a direction towards the tab as a positive direction, if the first distance vector is greater than 0 and the second distance vector is greater than 0, it is determined that the pasting of the first adhesive tape and the second adhesive tape is qualified.

As shown in FIG. 7(*a*) and FIG. 7 (*b*), with a direction towards the tab as a positive direction, that is, with a direction of an arrow e as a positive direction, if the first distance vector is greater than 0, it indicates that the first distance vector faces towards the positive direction, and the first end of the first adhesive tape away from the tab extends beyond the coating boundary of the electrode plate away from the tab; and if the second distance vector is greater than 0, it indicates that the second distance vector faces towards the positive direction, and the first end of the second adhesive tape away from the tab extends beyond the coating boundary of the electrode plate away from the tab. That is, both the first adhesive tape and the second adhesive tape have outcrops, and the outcrops of the two can also be bonded together under an electrostatic interaction, such that the adhesive tapes are not easy to fall off during the subsequent winding and rolling.

In this embodiment, whether the pasting of the first adhesive tape and the second adhesive tape is qualified can be accurately determined according to directions of the first distance vector and the second distance vector.

According to some embodiments of the present application, optionally, S23 specifically includes:

if an absolute value of a difference between the first distance vector and the second distance vector is within a preset range, it is determined that the pasting of the first adhesive tape and the second adhesive tape is qualified.

The absolute value of the difference between the first distance vector X and the second distance vector Y is $|X-Y|$. The preset range $[0,N]$ is an empirical value set by those skilled in the art according to outcrops of adhesive tapes, for example, N can be 3 mm.

If $0 \le |X-Y| \le N$, the first end of the first adhesive tape away from the tab extends beyond the coating boundary of the electrode plate away from the tab and the first end of the second adhesive tape away from the tab extends beyond the coating boundary of the electrode plate away from the tab, that is, both the first adhesive tape and the second adhesive tape have outcrops, indicating that the pasting of the adhesive tapes is qualified. It should be understood that, if $|X-Y|>3$, there is an unreasonable situation. For example, the unreasonable situation may include that an outcrop amount of the first adhesive tape is 3 mm, and the second adhesive tape has no outcrop; or an outcrop amount of the second adhesive tape is greater than 6 mm, which is not consistent with a set amount, and indicates that the pasting of the adhesive tapes is unqualified.

In this embodiment, whether the pasting of the first adhesive tape and the second adhesive tape is qualified can be accurately determined by comparing the absolute value of the difference between the first distance vector and the second distance vector with the preset range.

According to some embodiments of the present application, optionally, as shown in FIG. 7, an insulation coating is provided between the tab and the coating boundary of the electrode plate adjacent to the tab. It should be understood that the insulation coating is made of an insulation material. The insulation coating can prevent an internal short circuit caused by a contact of an adjacent electrode plate coating with an electrode plate foil.

A color distance between a color of the insulation coating and the color of the first adhesive tape is greater than or equal to a fourth preset value, and a color distance between the color of the insulation coating and the color of the second adhesive tape is greater than or equal to a fifth preset value.

The fourth preset value is a set gray threshold, which is provided to limit a discrimination index between the color of the first adhesive tape and the color of the insulation coating. The fifth preset value is a set gray threshold, which is provided to limit a discrimination index between the color of the second adhesive tape and the color of the insulation coating. It should be understood that the fourth preset value and the fifth preset value may be specifically set by those skilled in the art according to an actual situation, and in some embodiments, the fourth preset value and the fifth preset value may be the same or different.

It should be understood that the larger the color distance, the greater the difference between the two colors and the easier it is to distinguish between the two colors; and the smaller the color distance, the smaller the difference between the two colors and the less likely it is to distinguish between the two colors.

In a color space, a color distance between the color of the insulation coating and the color of the first adhesive tape is greater than or equal to a fourth preset value, such that the color of the first adhesive tape is significantly different from the color of the insulation coating, and it is easy to identify and distinguish the first adhesive tape and the insulation coating during an image test.

In a color space, a color distance between the color of the insulation coating and the color of the second adhesive tape is greater than or equal to a fifth preset value, such that the color of the second adhesive tape is significantly different from the color of the insulation coating, and it is easy to identify and distinguish the second adhesive tape and the insulation coating during an image test.

In some embodiments, the color of the insulation coating may be white (a gray value of white is about 255), the first adhesive tape may be brown (a gray value of an R channel of brown is 80 to 90), and the second adhesive tape may be blue (a gray value of an R channel of blue is 40 to 50); and the fourth preset value and the fifth preset value may each be 100 or 150. Due to a high discrimination index between brown or blue and white, the first adhesive tape and the second adhesive tape on the insulation coating can be clearly detected.

In order to well distinguish the insulation coating from the background, a color distance between a background color adjacent to the tab side in the first surface image and the color of the insulation coating is greater than or equal to a sixth preset value, and a color distance between a background color adjacent to the tab side in the second surface image and the color of the insulation coating is greater than or equal to the sixth preset value.

As shown in FIG. 4, during a transfer process of the electrode plate, the first surface can be photographed by the camera 1 # to obtain the first surface image including the first adhesive tape, and the second surface can be photographed by the camera 2 # to obtain the second surface image including the second adhesive tape.

The setting of the color distance between the background color adjacent to the tab side in the first surface image and the color of the insulation coating to be greater than or equal to the sixth preset value can be specifically implemented as follows: when the first surface image is acquired, a background can be arranged below the electrode plate, for example, the background can be a transfer table, a roller, or an arranged background plate; and the background color adjacent to the tab side (that is, a background color below the insulation coating) and the color of the first adhesive tape are set to make a color distance between the two colors greater than or equal to the sixth preset value.

The setting of the color distance between the background color adjacent to the tab side in the second surface image and the color of the insulation coating to be greater than or equal to the sixth preset value can be specifically implemented as follows: when the second surface image is acquired, a background can be arranged below the electrode plate, for example, the background can be a transfer table, a roller, or an arranged background plate; and the background color adjacent to the tab side (that is, a background color below the insulation coating) and the color of the second adhesive tape are set to make a color distance between the two colors greater than or equal to the sixth preset value.

Therefore, when the first surface image is subjected to an identification test, two boundaries of the insulation coating can be accurately captured; and when the second surface image is subjected to an identification test, the two boundaries of the insulation coating can be accurately captured.

As shown in FIG. 8, S20 specifically further includes:

S24: According to the first surface image, whether a second end of the first adhesive tape adjacent to the tab is located between a boundary of the insulation coating adjacent to the tab and a boundary of the insulation coating away from the tab is determined.

After the first surface image in which the first adhesive tape is easily distinguished from the insulation coating, the existing image recognition algorithm or pixel comparison algorithm can be used for the first surface image to acquire a boundary of the insulation coating adjacent to the tab and a boundary of the insulation coating away from the tab and to acquire the second end of the first adhesive tape adjacent to the tab. Therefore, based on a position relationship between the two boundaries of the insulation coating and the second end of the first adhesive tape, whether the second end of the first adhesive tape adjacent to the tab is located between the boundary of the insulation coating adjacent to the tab and the boundary of the insulation coating away from the tab can be determined.

S25: According to the second surface image, whether a second end of the second adhesive tape adjacent to the tab is located between the boundary of the insulation coating adjacent to the tab and the boundary of the insulation coating away from the tab is determined.

After the second surface image in which the second adhesive tape is easily distinguished from the insulation coating, the existing image recognition algorithm or pixel comparison algorithm can be used for the second surface image to acquire a boundary of the insulation coating adjacent to the tab and a boundary of the insulation coating away from the tab and to acquire the second end of the second adhesive tape adjacent to the tab. Therefore, based on a position relationship between the two boundaries of the insulation coating and the second end of the second adhesive tape, whether the second end of the second adhesive tape adjacent to the tab is located between the boundary of the insulation coating adjacent to the tab and the boundary of the insulation coating away from the tab can be determined.

S26: If the second end of the first adhesive tape adjacent to the tab is located between the boundary of the insulation coating adjacent to the tab and the boundary of the insulation coating away from the tab and the second end of the second adhesive tape adjacent to the tab is located between the boundary of the insulation coating adjacent to the tab and the boundary of the insulation coating away from the tab, it is determined that the pasting of the first adhesive tape and the second adhesive tape is qualified.

As shown in FIG. 7, the second end of the first adhesive tape and the second end of the second adhesive tape should extend towards the tab beyond a boundary 1 # of the insulation coating away from the tab and not beyond a boundary 2 # of the insulation coating adjacent to the tab, indicating that the pasting of the first adhesive tape and the second adhesive tape is qualified.

In this embodiment, in a first aspect, the color distance between the color of the insulation coating and the color of the first adhesive tape is greater than or equal to the fourth preset value, such that the color of the first adhesive tape is significantly different from the color of the insulation coating and it is easy to identify and distinguish the first adhesive tape and the insulation coating during an image test; and the color distance between the color of the insulation coating and the color of the second adhesive tape is greater than or equal to the fifth preset value, such that the color of the second adhesive tape is significantly different from the color of the insulation coating and it is easy to identify and distinguish the second adhesive tape and the insulation coating during an image test; and in a second aspect, the color distance between the background color adjacent to the tab side in the first surface image and the color of the insulation coating is set to be greater than or equal to the sixth preset value, and the color distance between the background color adjacent to the tab side in the second surface image and the color of the insulation coating is set to be greater than or equal to the sixth preset value, such that colors of insulation coatings on the first surface and the second surface are obvious in the first surface image and the second surface image, respectively, two boundaries of an insulation coating can be accurately captured when the first surface image is subjected to an identification test, and two boundaries of an insulation coating can be accurately captured when the second surface image is subjected to an identification test. Through the above two aspects, the accuracy of testing of application of the adhesive tapes can be effectively improved.

According to some embodiments of the present application, optionally, the sixth preset value is greater than the fourth preset value, and/or, the sixth preset value is greater than the fifth preset value.

It should be understood that the sixth preset value is provided to limit a discrimination index between the background color adjacent to the tab side in the first surface image and the color of the insulation coating, and to limit a discrimination index between the background color adjacent to the tab side in the second surface image and the color of the insulation coating. The fourth preset value is provided to limit a discrimination index between the color of the first adhesive tape and the color of the insulation coating. The fifth preset value is provided to limit a discrimination index between the color of the second adhesive tape and the color of the insulation coating.

The larger the gray threshold, the higher the discrimination index. By setting the sixth preset value to be greater than the fourth preset value, the discrimination index between the background color adjacent to the tab side in the first surface image and the color of the insulation coating is higher than the discrimination index between the color of the first adhesive tape and the color of the insulation coating, such that, when the first surface image is subjected to an image test, it is easy to accurately capture the two boundaries of the insulation coating, and then the second end of the first adhesive tape is determined with the two boundaries of the insulation coating as a reference, which is conducive to improvement of accuracy of testing of application of the adhesive tape. By setting the sixth preset value to be greater than the fifth preset value, the discrimination index between the background color adjacent to the tab side in the second surface image and the color of the insulation coating is higher than the discrimination index between the color of the second adhesive tape and the color of the insulation coating, such that, when the second surface image is subjected to an image test, it is easy to accurately capture the two boundaries of the insulation coating, and then the second end of the first adhesive tape is determined with the two boundaries of the insulation coating as a reference, which is conducive to improvement of accuracy of testing of application of the adhesive tape.

In this embodiment, by setting a size relationship among the three gray thresholds of the fourth preset value, the fifth preset value, and the sixth preset value, it is easy to identify the insulation coating from the background of the first surface image, and it is easy to identify the insulation coating from the background of the second surface image, which is conducive to improvement of accuracy of testing of application of the adhesive tapes.

According to some embodiments of the present application, optionally, the background color adjacent to the tab side in the first surface image is black, and/or, the background color adjacent to the tab side in the second surface image is black.

For example, as shown in FIG. 4, when the first surface image is acquired, a roller is arranged below the second surface of the electrode plate, and the roller can transfer the electrode plate and serve as a background for acquisition of the first surface image. A color of a region of the roller on which an edge of the electrode plate adjacent to the tab side is projected is the background color adjacent to the tab side in the first surface image, and a region of the roller on which an edge of the electrode plate adjacent to the tab side is projected is set to be black.

It should be understood that, when the first surface image is acquired, a background plate is arranged below the second surface of the electrode plate; and a color of a region of the background plate on which an edge of the electrode plate adjacent to the tab side is projected is the background color adjacent to the tab side in the first surface image, and a region of the background plate on which an edge of the electrode plate adjacent to the tab side is projected is set to be black.

Because black has a gray value of about 0 and can be clearly distinguished from the color of the insulation coating on the electrode plate (the insulation coating is generally white), the two boundaries of the insulation coating can be clearly captured.

In this embodiment, by setting the background color adjacent to the tab side in the first surface image to be black and setting the background color adjacent to the tab side in the second surface image to be black, the insulation coating on the electrode plate can be clearly distinguished from a background, such that the two boundaries of the insulation coating can be clearly captured, which is conducive to improvement of accuracy of testing of application of the adhesive tapes.

According to some embodiments of the present application, a method for testing an adhesive tape pasted onto a surface of an electrode plate is provided, where the electrode plate to be tested has a first surface and a second surface; a first adhesive tape and a second adhesive tape are pasted onto the first surface and the second surface, respectively; the first adhesive tape is brown and the second adhesive tape is blue; and a color distance between brown and blue is greater than 40 (the third preset value).

The method for testing an adhesive tape pasted onto a surface of an electrode plate is used between a die-cutting and slitting procedure and a winding procedure. The method includes:

(1) As shown in FIG. 4, a first surface image is acquired by a camera 1 # and a second surface image is acquired by a camera 2 #, where the first surface image includes an image of the first adhesive tape and the second surface image includes an image of the second adhesive tape. The first adhesive tape and the second adhesive tape are not shown in FIG. 4.

The first surface and the second surface of the electrode plate each are coated with a black electrochemical coating material, and a white insulation coating is provided between a tab and a coating boundary adjacent to the tab. For qualified application, the first end of the first adhesive tape and the first end of the second adhesive tape should extend beyond a coating boundary of the electrode plate away from the tab side, and the second end of the first adhesive tape and the second end of the second adhesive tape should extend beyond a boundary of the insulation coating away from the tab and not beyond a boundary of the insulation coating adjacent to the tab.

When the first surface image is acquired by the camera 1 #, a background is a black-white roller, where one end of the black-white roller is black, and the other end of the black-white roller is white. When the electrode plate is transferred on the black-white roller, an image of an electrode plate section on the black-white roller is acquired by the camera 1 #, where an edge of the electrode plate away from the tab side falls to a white region on the black-white roller, and an edge of the electrode plate adjacent to the tab side falls to a black region on the black-white roller. Therefore, the first end of the first adhesive tape and the first end of the second adhesive tape fall to the white region on the black-white roller, and because a color distance between white and brown is roughly 170 (greater than the first preset value) and a color distance between white and blue is roughly 200 (greater than the second preset value), the first end of the brown first adhesive tape and the first end of the blue second adhesive tape can be easily identified and distinguished under a white background. The second end of the first adhesive tape and the second end of the second adhesive tape fall to the white insulation coating, and the white insulation coating falls to a black region on the black-white roller; and because a color distance between white and black is roughly 255 (greater than the sixth preset value), a color distance between white and brown is roughly 170 (greater than the fourth preset value), and a color distance between white and blue is roughly 200 (greater than the fifth preset value), the white insulation coating can be easily identified and distinguished under a black background, and the second end of the first adhesive tape and the second end of the second adhesive tape can be easily identified and distinguished under a white background.

(2) The first surface image is subjected to pixel comparison to obtain an application situation (shape and position) of the first adhesive tape, and similarly, the second surface image is subjected to pixel comparison to obtain an application situation (shape and position) of the second adhesive tape; and then whether the pasting of the first adhesive tape and the second adhesive tape is qualified can be determined.

In a first aspect, in this embodiment, by setting the color distance between the background color away from the tab side in the first surface image and the color of the first adhesive tape to be greater than or equal to the first preset value and setting the color distance between the background color away from the tab side in the second surface image and the color of the second adhesive tape to be greater than or equal to the second preset value, the colors of the first adhesive tape and the second adhesive tape each are significantly different from a corresponding background color, such that a shape of the first adhesive tape and a position of the first adhesive tape relative to the electrode plate can be identified according to the first surface image, and a shape of the second adhesive tape and a position of the second adhesive tape relative to the electrode plate can be identified according to the second surface image, such as to accurately determine whether the pasting of the first adhesive tape and the second adhesive tape is qualified, which can increase the safety of a battery.

In a second aspect, the color distance between the color of the insulation coating and the color of the first adhesive tape is greater than or equal to the fourth preset value, such that the color of the first adhesive tape is significantly different from the color of the insulation coating and it is easy to identify and distinguish the first adhesive tape and the insulation coating during an image test; and the color distance between the color of the insulation coating and the color of the second adhesive tape is greater than or equal to the fifth preset value, such that the color of the second adhesive tape is significantly different from the color of the insulation coating and it is easy to identify and distinguish the second adhesive tape and the insulation coating during an image test.

In a third aspect, the color distance between the background color adjacent to the tab side in the first surface image and the color of the insulation coating is set to be greater than or equal to the sixth preset value, and the color distance between the background color adjacent to the tab side in the second surface image and the color of the insulation coating is set to be greater than or equal to the sixth preset value, such that colors of insulation coatings on the first surface and the second surface are obvious in the first surface image and the second surface image, respectively, two boundaries of an insulation coating can be accurately captured when the first surface image is subjected to an identification test, and two boundaries of an insulation coating can be accurately captured when the second surface image is subjected to an identification test. Through the above three aspects, the accuracy of testing of application of the adhesive tapes can be effectively improved.

According to some embodiments of the present application, as shown in FIG. 9, the present application further provides an apparatus 300 for testing an adhesive tape pasted onto a surface of an electrode plate, including an image acquisition module 301 and a pasting qualification determination module 302.

The image acquisition module 301 is configured to acquire a first surface image and a second surface image, where the first surface image includes an image of a first adhesive tape and the second surface image includes an image of a second adhesive tape; and a color distance between a background color away from a tab side in the first surface image and a color of the first adhesive tape is greater than or equal to a first preset value, and a color distance between a background color away from the tab side in the second surface image and a color of the second adhesive tape is greater than or equal to a second preset value.

The pasting qualification determination module is configured to determine whether application of the first adhesive tape and the second adhesive tape is qualified according to the first surface image and the second surface image.

It should be noted that the content not mentioned in an embodiment corresponding to FIG. 9 may be described with reference to the embodiment of the method for testing an adhesive tape pasted onto an electrode plate described above, which will not be repeated here.

In this embodiment, by setting the color distance between the background color away from the tab side in the first surface image and the color of the first adhesive tape to be greater than or equal to the first preset value and setting the color distance between the background color away from the tab side in the second surface image and the color of the second adhesive tape to be greater than or equal to the second preset value, the colors of the first adhesive tape and the second adhesive tape each are significantly different from a corresponding background color, such that a shape of the first adhesive tape and a position of the first adhesive tape relative to the electrode plate can be identified according to the first surface image, and a shape of the second adhesive tape and a position of the second adhesive tape relative to the electrode plate can be identified according to the second surface image, such as to accurately determine whether the pasting of the first adhesive tape and the second adhesive tape is qualified, which can increase the safety of a battery.

Figure 10:
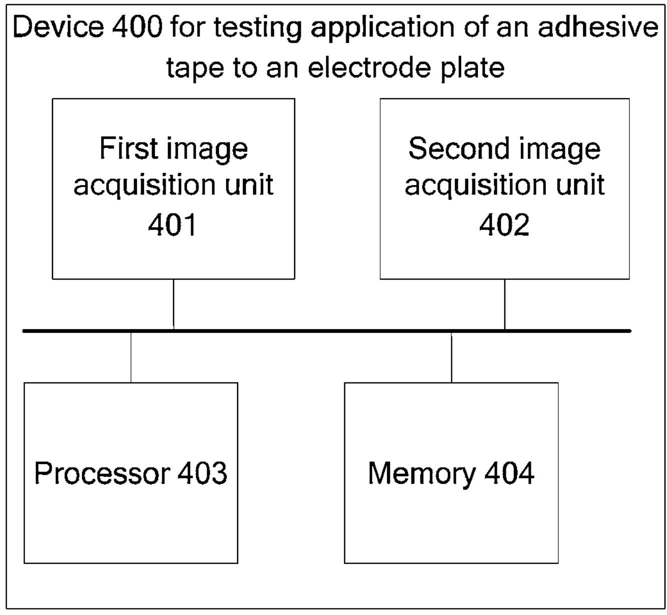
FIG. 10 is a schematic structural diagram of a device 400 for testing an adhesive tape pasted onto an electrode plate in some embodiments of the present application.

According to some embodiments of the present application, as shown in FIG. 10, the present application further provides a device 400 for testing an adhesive tape pasted onto an electrode plate, where the electrode plate has a first surface and a second surface, and a first adhesive tape and a second adhesive tape are pasted onto the first surface and the second surface of the electrode plate at preset positions, respectively.

The device 400 for testing an adhesive tape pasted onto an electrode plate includes a first image acquisition unit 401, a second image acquisition unit 402, a processor 403, and a memory 404. The first image acquisition unit 401 is configured to acquire a first surface image, where the first surface image includes an image of the first adhesive tape, and a color distance between a background color away from a tab side in the first surface image and a color of the first adhesive tape is greater than or equal to a first preset value. The second image acquisition unit 402 is configured to acquire a second surface image, where the second surface image includes an image of the second adhesive tape, and a color distance between a background color away from the tab side in the second surface image and a color of the second adhesive tape is greater than or equal to a second preset value.

The processor 403 is in communication connection with each of the first image acquisition unit 401 and the second image acquisition unit 402 to acquire the first surface image and the second surface image. The memory 404 is in communication connection with the processor 403, the memory 404 stores an instruction capable of being executed by the processor 403, and when the instruction is executed by the processor 403, the processor 403 executes the method for testing an adhesive tape pasted onto a surface of an electrode plate in the embodiment of the present application.

The memory 404 may include a read-only memory (ROM) and a random-access memory (RAM), and can provide instructions and data for the processor. A part of the memory 404 may further include a non-volatile random-access memory (NVRAM). The memory 404 stores an operating instruction, an executable module, or a data structure, or a subset thereof, or an extended set thereof.

The processor 403 may be an integrated circuit (IC) chip capable of processing a signal. In an implementation process, the steps of the method for testing an adhesive tape pasted onto a surface of an electrode plate in the embodiment of the present application may be conducted through an integrated logic circuit of hardware in the processor 403 or an instruction in the form of software. The processor 403 may be a general-purpose processor, a digital signal processor (DSP), a microprocessor, or a microcontroller, and may further include an application-specific integrated circuit (ASIC), a field-programmable gate array (FPGA), another programmable logic device, a discrete gate or transistor logic device, or a discrete hardware component. The processor may implement or execute the method for testing an adhesive tape pasted onto a surface of an electrode plate in the embodiment of the present application.

It should be noted that each operation may be implemented with reference to a corresponding description of the embodiment of the method for testing an adhesive tape pasted onto an electrode plate; and the processor 403 may also conduct other operations of the embodiment of the method for testing an adhesive tape pasted onto an electrode plate in conjunction with other functional hardware.

According to some embodiments of the present application, the present application also provides a machine for applying an adhesive tape to an electrode plate, including the device for testing an adhesive tape pasted onto an electrode plate described above.

In the above embodiment, the device for testing an adhesive tape pasted onto an electrode plate can accurately test whether the pasting of an adhesive tape to a surface of an electrode plate is qualified.

It should be understood that, when the pasting of an adhesive tape to an electrode plate is tested, the device for testing an adhesive tape pasted onto an electrode plate is arranged around or on the machine for applying an adhesive tape to an electrode plate, such that the device for testing an adhesive tape pasted onto an electrode plate can be used in combination with the machine for applying an adhesive tape to an electrode plate to provide a function of testing application of an adhesive tape for the machine. Thus, the machine for applying an adhesive tape to an electrode plate includes the function of the device for testing an adhesive tape pasted onto an electrode plate.

As stated above, it should be noted that the foregoing embodiments are provided merely for describing the technical solutions of the present application, but not for limiting the present application. Although the present application is described in detail with reference to the above embodiments, a person of ordinary skill in the art should understand that they may still make modifications to the technical solutions described in the above embodiments or make equivalent replacements to some or all technical features thereof; and these modifications or replacements do not make the essence of the corresponding technical solution depart from the scope of the technical solutions of the embodiments of the present application, and shall fall within the scope of claims and specification of the present application. In particular, as long as there is no structural conflict, the technical features in the embodiments may be combined in any way. The present application is not limited to the specific embodiments disclosed herein, but should include all technical solutions falling within the scope of the claims.

What is claimed is:

1. A method for detecting adhesive tape on the surface of a polar plate, comprising that the polar plate has a first surface and a second surface, and a first adhesive tape and a second adhesive tape are respectively adhered to the first surface and the second surface;

the detection method includes: obtaining a first surface image and a second surface image, wherein the first surface image includes an image of the first adhesive tape, and the second surface image includes an image of the second adhesive tape, and the color distance between the background color far from the tab side in the first surface image and the color of the first adhesive tape is greater than or equal to a first preset value, and the color distance between the background color far from the tab side in the second surface image and the color of the second adhesive tape is greater than or equal to a second preset value; obtaining the shape and position of the first adhesive tape and the shape and position of the second adhesive tape based on the first surface image and the second surface image, and determining whether the first adhesive tape and the second adhesive tape are adhered properly by comparing the shape and position of the first adhesive tape and the second adhesive tape, wherein determining whether the first adhesive tape and the second adhesive tape are adhered properly based on the first surface image and the second surface image includes: obtaining a first distance vector from the first end of the first adhesive tape far from the tab to the coating boundary far from the tab on the polar plate based on the first surface image; obtaining a second distance vector from the first end of the second adhesive tape far from the tab to the coating boundary far from the tab on the polar plate based on the second surface image; and determining whether the first adhesive tape and the second adhesive tape are adhered properly based on the magnitude and direction of the first distance vector and the second distance vector; wherein the determining whether the first adhesive tape and the second adhesive tape are adhered properly based the first distance vector and the second distance vector comprises:

with a direction towards the tab as a positive direction, if the first distance vector is greater than 0 and the second distance vector is greater than 0, determining that the pasting of the first adhesive tape and the second adhesive tape are adhered properly.

2. The method according to claim 1, wherein a color distance between the color of the first adhesive tape and the color of the second adhesive tape is greater than or equal to a third preset value.

3. The method according to claim 2, wherein the first preset value is greater than the third preset value, and the second preset value is greater than the third preset value.

4. The method according to claim 1, wherein the background color away from the tab side in the first surface image is white, and/or, the background color away from the tab side in the second surface image is white.

5. A method for detecting adhesive tape on the surface of a polar plate, comprising that the polar plate has a first surface and a second surface, and a first adhesive tape and a second adhesive tape are respectively adhered to the first surface and the second surface;

the detection method includes: obtaining a first surface image and a second surface image, wherein the first surface image includes an image of the first adhesive tape, and the second surface image includes an image of the second adhesive tape, and the color distance between the background color far from the tab side in the first surface image and the color of the first adhesive tape is greater than or equal to a first preset value, and the color distance between the background color far from the tab side in the second surface image and the color of the second adhesive tape is greater than or equal to a second preset value; obtaining the shape and position of the first adhesive tape and the shape and position of the second adhesive tape based on the first surface image and the second surface image, and determining whether the first adhesive tape and the second adhesive tape are adhered properly by comparing the shape and position of the first adhesive tape and the second adhesive tape, wherein determining whether the first adhesive tape and the second adhesive tape are adhered properly based on the first surface image and the second surface image includes: obtaining a first distance vector from the first end of the first adhesive tape far from the tab to the coating boundary far from the tab on the polar plate based on the first surface image; obtaining a second distance vector from the first end of the second adhesive tape far from the tab to the coating boundary far from the tab on the polar plate based on the second surface image; and determining whether the first adhesive tape and the second adhesive tape are adhered properly based on the magnitude and direction of the first distance vector and the second distance vector; wherein the determining whether the first adhesive tape and the second adhesive tape are adhered properly based on the first distance vector and the second distance vector includes: if the absolute value of the difference between the first distance vector and the second distance vector is within a preset range, it is determined that the first adhesive tape and the second adhesive tape are adhered properly.

6. A method for detecting adhesive tape on the surface of a polar plate, comprising that the polar plate has a first surface and a second surface, and a first adhesive tape and a second adhesive tape are respectively adhered to the first surface and the second surface;

the detection method includes: obtaining a first surface image and a second surface image, wherein the first surface image includes an image of the first adhesive tape. and the second surface image includes an image of the second adhesive tape, and the color distance between the background color far from the tab side in the first surface image and the color of the first adhesive tape is greater than or equal to a first preset value, and the color distance between the background color far from the tab side in the second surface image and the color of the second adhesive tape is greater than or equal to a second preset value; obtaining the shape and position of the first adhesive tape and the shape and position of the second adhesive tape based on the first surface image and the second surface image, and determining whether the first adhesive tape and the second adhesive tape are adhered properly by comparing the shape and position of the first adhesive tape and the second adhesive tape, wherein an insulating coating is provided between the coating boundary of the electrode sheet close to the tab and the tab, the color distance between the color of the insulating coating and the color of the first adhesive tape is greater than or equal to a fourth preset value, the color distance between the color of the insulating coating and the color of the second adhesive tape is greater than or equal to a fifth preset value, the color distance between the background color close to the tab side in the first surface image and the color of the insulating coating is greater than or equal to a sixth preset value, and the color distance between the background color close to the tab in the second surface image and the color of the insulating coating is greater than or equal to the sixth preset value;

the determination of whether the first adhesive tape and the second adhesive tape are adhered properly based on the first surface image and the second surface image further includes:

determining whether the second end of the first adhesive tape close to the tab is between the boundary of the insulating coating close to the tab and the boundary of the insulating coating far from the tab based on the first surface image;

determining whether the second end of the second adhesive tape close to the tab is between the boundary of the insulating coating close to the tab and the boundary of the insulating coating far from the tab based on the second surface image;

if the second end of the first adhesive tape close to the tab is between the boundary of the insulating coating close to the tab and the boundary of the insulating coating far from the tab and the second end of the second adhesive tape close to the tab is between the boundary of the insulating coating close to the tab and the boundary of the insulating coating far from the tab, it is determined that the first adhesive tape and the second adhesive tape are adhered properly.

7. The method according to claim 6, wherein the sixth preset value is greater than the fourth preset value, and/or, the sixth preset value is greater than the fifth preset value.

8. The method according to claim 6, wherein the background color close to the tab side in the first surface image is black, and/or, the background color adjacent to the tab side in the second surface image is black.

9. The method according to claim 5, wherein a color distance between the color of the first adhesive tape and the color of the second adhesive tape is greater than or equal to a third preset value.

10. The method according to claim 9, wherein the first preset value is greater than the third preset value, and the second preset value is greater than the third preset value.

11. The method according to claim 5, wherein the background color away from the tab side in the first surface image is white, and/or, the background color away from the tab side in the second surface image is white.

12. The method according to claim 6, wherein a color distance between the color of the first adhesive tape and the color of the second adhesive tape is greater than or equal to a third preset value.

13. The method according to claim 12, wherein the first preset value is greater than the third preset value, and the second preset value is greater than the third preset value.

14. The method according to claim 6, wherein the background color away from the tab side in the first surface image is white, and/or, the background color away from the tab side in the second surface image is white.

15. The detection method according to claim 6, wherein determining whether the first adhesive tape and the second adhesive tape are adhered properly based on the first surface image and the second surface image includes:

obtaining a first distance vector from the first end of the first adhesive tape far from the tab to the coating boundary far from the tab on the polar plate based on the first surface image; obtaining a second distance vector from the first end of the second adhesive tape far from the tab to the coating boundary far from the tab on the polar plate based on the second surface image; and determining whether the first adhesive tape and the second adhesive tape are adhered properly based on the magnitude and direction of the first distance vector and the second distance vector.

* * * * *